March 5, 1935.  Y. SEKELLA  1,993,628

ENGINE STARTER

Filed Dec. 27, 1930

*INVENTOR*
Youston Sekella
BY Clinton S. Jones
*ATTORNEY*

Patented Mar. 5, 1935

1,993,628

UNITED STATES PATENT OFFICE 1,993,628

ENGINE STARTER

Youston Sekella, Elmira Heights, N. Y., assignor to Eclipse Machine Company, Elmira, N. Y., a corporation of New York Application December 27, 1930, Serial No. 505,040

12 Claims. (Cl. 74—9)

This invention relates to engine starters and more particularly to an automatic shift for starter gearing of the type in which a motor driven pinion is automatically moved into and out of mesh with a gear mounted on a member of the engine to be started.

It is an object of this invention to provide a novel device of the above character which is efficient in operation and simple and economical in construction.

Another object of the invention is to provide such a device which includes yielding elements for shifting and driving the pinion, and in which the yielding effect of said elements is greatest at the beginning of the meshing operation.

A further object is to provide such a device in which the thrusts set up in the parts react upon said parts without being transmitted through external fastening means or elements mechanically joined thereto.

Another object of the invention is the provision of such a device which includes improved means for securing the yielding elements of the drive.

Figure 1:
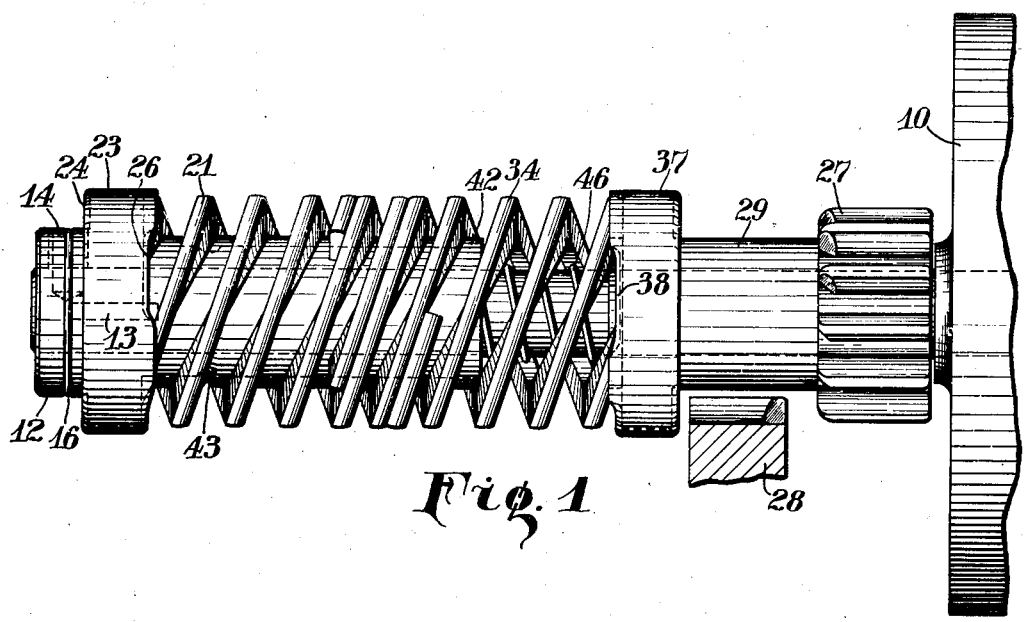
Figure 2:
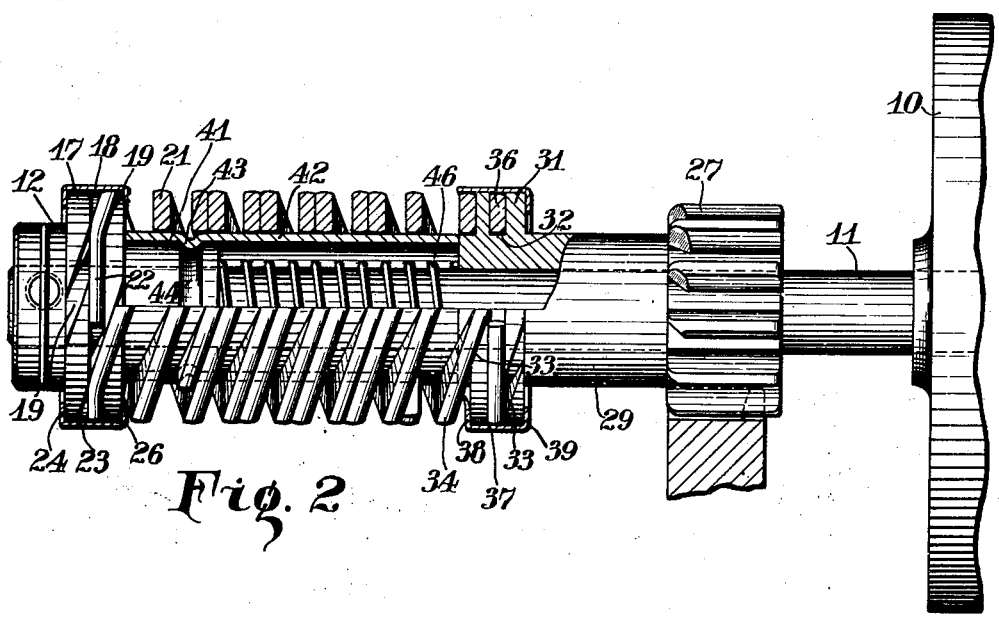

Further objects and advantages of the invention will be apparent to those skilled in the art from the following description taken in connection with the accompanying drawing in which:

Fig. 1 is a side elevation of the device showing the parts in normal or idle position; and Fig. 2 is a side elevation of the same partly in section, showing the parts in their driving position.

In the embodiment of the invention herein illustrated, a starting motor 10 is provided with a power member in the form of a smooth extended armature shaft 11 on the outer end of which is rigidly mounted an anchoring means in the form of a collar 12 suitably fixed to the shaft 11 as by means of a key 13 and set screw 14 which may be retained by a spring ring 16.

The collar 12 is provided with a circular enlarged portion 17 having a circumferential groove 18 and a series of oblique grooves 19 formed in the periphery thereof. A plurality of yieldable shifting and driving members in the form of spiral springs 21 are formed at one end to traverse the oblique grooves 19 and have flat arcuate portions 22 adapted to fit in the circumferential groove 18 whereby said springs are maintained coaxial with the shaft 11 and extending toward the motor 10 from the anchoring collar 14. A retaining sleeve 23 is arranged to surround the enlarged portion 17 of the collar 12 covering the slots 18 and 19, thus confining the ends 22 of springs 21 within said enlarged portion 17, and having flanges 24 and 26 adapted to embrace the enlarged portion 17 and prevent displacement of said retaining sleeve.

A driving member in the form of a pinion 27 is freely mounted on the shaft 11 adjacent the motor 10 in position to be moved into and out of engagement with a toothed member 28 such as a gear on the flywheel of the engine to be started. The pinion 17 is provided with an extended hub 29 terminating in an enlarged anchoring portion 31. The anchoring portion 31 is provided with a circumferential groove 32 and a series of oblique grooves 33 in its periphery. A plurality of spiral springs 34 adapted to cooperate with springs 21 are formed at one end to enter the oblique grooves 33 and have flat arcuate ends 36 adapted to fit in the circumferential groove 32. A retaining sleeve 37 is arranged to surround the anchoring portion 31, covering the grooves 32 and 33 to confine the ends 36 of springs 34 therein, and is provided with flanges 38 and 39 adapted to embrace the anchoring portion 31 and prevent displacement of sleeve 37. The springs 34 are thus maintained in coaxial relation with the shaft 11 and extending toward the collar 12. The combined length of springs 21 and 34 is greater than the normal distance between the pinion and collar whereby the free ends of the springs are interthreaded with each other when the pinion 27 is in its idle position as illustrated in Fig. 1.

The collar 12 is provided with an axial extension 41 of reduced diameter extending toward the pinion 27, and an abutment member in the form of a sleeve 42 is mounted on said extension 41, being retained thereon as by means of depressed portions 43 which engage in a circumferential groove 44 of said extension. The abutment member 42 is arranged to form a stop for the pinion 27 in its meshing position as shown in Fig. 2 by engaging the enlarged portion 31 of said pinion hub when said pinion 27 is in meshing relation with the member 28 of the engine to be started. This engagement is arranged to take place as shown in Fig. 2 before the springs have reached the limit of their telescoping action. Suitable means are provided for normally retaining the pinion in demeshed position such as a light spiral anti-drift spring 46 mounted on the shaft 11 between the pinion 27 and collar 12, said spring being housed within the sleeve 42 when the parts are in driving position.

The parts may be assembled as follows: The ends of springs 34 are placed in the grooves 32 and 33 of the anchoring enlargement 31 of the pinion hub, the sleeve 37 with the flange 39 formed thereon is slipped over the pinion onto the enlargement 31 and flange portions 38 are bent inwardly to lock this assembly together. The springs 21 are mounted in the same manner on the enlargement 17 of collar 12 and are retained thereon by the sleeve 23 having the flange 24 formed thereon and the flange portions 26 thereafter bent down to retain the parts. The abutment sleeve 42 is thereupon slipped within the springs 21 onto the extension 41 of the collar 12, and is retained on said extension by punching depressions 43 in said sleeve 41 to engage the groove 44 in said extension. The pinion assembly is then slipped on the shaft 11, followed by the spring 46. The key 13 is then placed in the shaft and the collar assembly is then slipped on said shaft, the ends of springs 21 entering between the ends of springs 34 until the collar is properly located on the shaft whereupon the collar is retained in position by the set screw 14.

In operation, energization of motor 10 will cause the rapid acceleration of shaft 11, collar 12, and springs 21. Due to the inertia of the pinion 27 and its associated parts, the pinion will be drawn into mesh with the toothed member 28 by the threading action of the springs 21 and 34 until the end of the pinion hub 29 engages the abutment sleeve 42. Further rotation of the collar 12 with respect to the pinion causes the two sets of springs to bind on each other forming a self-tightening frictional and yielding coupling between the collar and pinion. The pinion is thus forced to rotate with the shaft 11, causing rotation of the member 28 to crank the engine. When the engine starts, the rapid rotation of the member 28 causes the pinion 27 to overrun the shaft 11 whereupon the threading action of the springs 21 and 34 is reversed and the pinion 27 is moved out of engagement with the member 28 in which position it is yieldingly maintained by the anti-drift spring 46.

If the teeth of the pinion 27 should in the starting operation engage end to end with the teeth of the member 28, the springs 21 and 34 are adapted to yield and gradually build up sufficient friction therebetween to cause the indexing of the pinion into proper meshing relation with the teeth of the member 28, and thereafter the meshing relation is completed. The springs 21 and 34 are preferably formed of rectangular cross-section with comparatively large radial height and small axial thickness in order to provide ample stiffness and friction surface therebetween to transmit the driving forces, while being axially yieldable sufficiently to properly cushion the meshing action.

It will be noted that due to the fact that the overlap of the springs is least when the pinion is demeshed and increases as the pinion is drawn into mesh, the drive is initially comparatively limber, and becomes stiffer as meshing takes place. That is, the axial cushioning effect is greatest at the initiation of the meshing operation and the torque capacity of the coupling formed by said springs is greatest when the parts are in driving position. Furthermore, the thrusts engendered by the wedging action of the springs on each other are taken directly by the abutment sleeve 42 interposed between the pinion and collar whereby there are no fastening means or joints subjected to shearing stresses. It will be also noted that the method of mounting the springs in their anchoring elements causes the torque to be transmitted to and from the springs without localized bending moments at their ends, and provides a mechanical interlocking of the parts which avoids the use of fastening elements subjected to driving stresses and which involves no weakening of the springs by machining or other mechanical operations.

Although but one embodiment of the invention has been shown and described in detail it will be understood that various changes may be made in the precise construction shown and equivalent features may be substituted where desired without departing from the spirit of the invention as defined in the claims appended hereto.

What is claimed is:

1. A starter drive for internal combustion engines including a driving member adapted to engage and drive a member of the engine to be started, a power member, a yielding spiral element anchored at one end to the power member, a spiral element anchored at one end to the driving member, the ends of said spirals being arranged to overlap when the driving member is in disengaged position, rotation of said power member being adapted to thread the spiral members together to draw the driving member into engagement with the engine member means for limiting the overlapping of the spiral elements, thereby causing said elements to transmit rotation from the power member to the driving member.

2. A starter drive for internal combustion engines including a driving member adapted to engage and drive a member of the engine to be started, a power member, an anchor member fixed to the power member, said anchor member and driving member being provided with spiral transmission elements the free ends of said spiral elements being arranged to overlap when the driving member is in disengaged position, rotation of said power member being adapted to thread the spiral members together to draw the driving member into engagement with the engine member, and spacing means between the anchor member and the driving member adapted to limit said threading motion and thus constrain the driving member to rotate with the power member.

3. A starter drive for internal combustion engines including a driving member adapted to engage and drive a member of the engine to be started, a power member, an anchor member fixed to the power member, a yielding spiral transmission element anchored at one end to said driving member, a spiral transmission element anchored at one end to said anchor member, the free ends of said spiral elements being arranged to overlap when the driving member is in disengaged position, rotation of said power member being adapted to thread the spiral members together to draw the driving member into engagement with the engine member, and spacing means within said spiral members between the anchor member and driving member adapted to limit said threading motion and to maintain said spiral members in coaxial relation.

4. A starter drive for internal combustion engines including a driving member adapted to engage and drive a member of the engine to be started, a power member, an anchor member fixed to the power member, said anchor member and driving member being provided with spiral transmission elements the free ends of said spiral elements being arranged to overlap when the driving member is in disengaged position, rotation of said power member being adapted to thread the spiral members together to draw the driving member into engagement with the engine member, and spacing means between the anchor member and the driving member adapted to limit said threading motion and thus constrain the driving member to rotate with the power member, and yielding means normally maintaining the driving member in disengaged position.

5. A starter drive for internal combustion engines including a driving member adapted to engage and drive a member of the engine to be started, a power member, an anchor member fixed to the power member, a yielding spiral transmission element anchored at one end to said driving member, a spiral transmission element anchored at one end to said anchor member the free ends of said spiral elements being arranged to overlap when the driving member is in disengaged position, rotation of said power member being adapted to thread the spiral members together to draw the driving member into engagement with the engine member, spacing means within said spiral members between the anchor member and driving member adapted to limit said threading motion and to maintain said spiral members in coaxial relation, and yielding means between the anchor member and the driving member normally maintaining the driving member in disengaged position, said yielding means being housed within said spacing means when the driving member is in driving engagement with the engine member.

6. An engine starter drive including a rotatable shaft, a spiral spring thereon, a driving member mounted freely on said shaft, a spiral spring fixed thereto in alignment with and in interthreaded relation to the first spring whereby rotation of the shaft causes translation of the driving member, and a sleeve on said shaft within said springs adapted to maintain said springs coaxial and to limit the interthreaded relation thereof.

7. An engine starter drive including a rotatable shaft, a collar fixed thereon, a pinion freely mounted thereon for longitudinal motion into and out of engagement with a member of the engine to be started, said collar having a peripheral circumferential slot and an oblique slot communicating therewith, a spiral spring arranged to enter said oblique slot and having an arcuate terminal portion formed to seat in said circumferential slot, a sleeve surrounding said collar to confine the end of the ring thereon, and means on said pinion cooperating with said spring to actuate the pinion.

8. An engine starter drive including a rotatable shaft, a collar fixed thereon, a pinion freely mounted thereon for longitudinal motion into and out of engagement with a member of an engine to be started, said pinion having an extending hub terminating with a circumferential enlargement, said enlargement being provided with a circumferential slot and an oblique slot communicating therewith, a spiral spring arranged to enter said oblique slot and having a flat arcuate terminal portion formed to seat in said circumferential slot, a sleeve surrounding said enlargement to confine the end of the spring therein, and means on said shaft cooperating with said spring to actuate the pinion.

9. An engine starter drive including a rotatable shaft, a driving pinion freely mounted thereon, a collar fixed to said shaft, said pinion and collar having spiral springs anchored thereto at one end and with their free ends interthreaded, said collar having a hub extending toward said pinion within said springs, and a sleeve mounted on said collar within said springs and acting as a stop for the pinion to limit the interthreading of said springs.

10. An engine starter drive including a rotatable shaft, a driving pinion freely mounted thereon, a collar fixed to said shaft, said pinion and collar having spiral springs anchored thereto at one end and with their free ends interthreaded, said collar having a hub extending toward said pinion within said springs, a sleeve mounted on said collar within said springs and acting as a stop for the pinion to limit the interthreading of said springs, and a spring on said shaft within said sleeve normally maintaining the pinion in spaced relation to said sleeve.

11. In an engine starter drive, a rotatable element, a spiral spring, and means for anchoring said spring to said element including a circular anchoring member rigid with said element, said anchoring member having a circumferential groove and an oblique groove communicating therewith adapted to receive the end of said spring, and a retaining sleeve surrounding said anchoring member and closing said grooves.

12. In an engine starter drive, a rotatable element, a spiral spring and means for anchoring said spring to said element including a circular anchoring member rigid with said element, said anchoring member having a circumferential groove and an oblique groove communicating therewith adapted to receive the end of said spring, said spring being arranged to traverse the oblique groove and having a flat arcuate portion formed to fit in said circumferential groove and a retaining sleeve surrounding said anchoring member to cover said grooves and having flanges adapted to embrace said anchoring member and prevent displacement thereon.

YOUSTON SEKELLA.